United States Patent [19]

Heuchert

[11] 4,197,620

[45] Apr. 15, 1980

[54] HOSE CLAMP

[76] Inventor: John M. Heuchert, 21704 Statler, St. Clair Shores, Mich. 48081

[21] Appl. No.: 904,316

[22] Filed: May 10, 1978

[51] Int. Cl.² ............................................. F16L 33/08
[52] U.S. Cl. .................................................. 24/274 R
[58] Field of Search ............ 24/274 R, 274 P, 274 WB

[56] References Cited

U.S. PATENT DOCUMENTS

| | | |
|---|---|---|
| 2,990,599 | 7/1961 | Gustavsson ........................ 24/274 R |
| 3,100,327 | 8/1963 | Spector ............................... 24/274 R |
| 3,840,018 | 10/1974 | Heifetz ............................... 24/274 R |
| 3,914,832 | 10/1975 | Petrus ................................. 24/274 R |
| 4,021,892 | 5/1977 | Piper .................................... 24/274 R |
| 4,024,609 | 5/1977 | Haynes ................................ 24/274 R |
| 4,047,268 | 9/1977 | Buttriss ................................ 24/274 R |

FOREIGN PATENT DOCUMENTS

| | | | |
|---|---|---|---|
| 2000470 | 7/1970 | Fed. Rep. of Germany ........ | 24/274 R |
| 206050 | 7/1966 | Sweden ................................. | 24/274 R |
| 682935 | 11/1952 | United Kingdom ................... | 24/274 R |

*Primary Examiner*—Bernard A. Gelak
*Attorney, Agent, or Firm*—Harness, Dickey & Pierce

[57] ABSTRACT

An adjustable hose-type clamping device fabricated entirely of a polymeric material, the device comprising an elongated flexible strap element having a thread form provided integrally along a portion of one side thereof; an enclosure member is fixedly secured adjacent one end of the strap element and includes spaced apart end wall portions and an arcuate-shaped side wall portion, a gear element disposed within the enclosure member and includes a double enveloping worm gear form adapted for engagement with the thread form on the strap element, one end of the gear is provided with a tool engaging portion whereby the gear element may be selectively rotated to effect advancement of the strap relative to the enclosure member.

7 Claims, 6 Drawing Figures

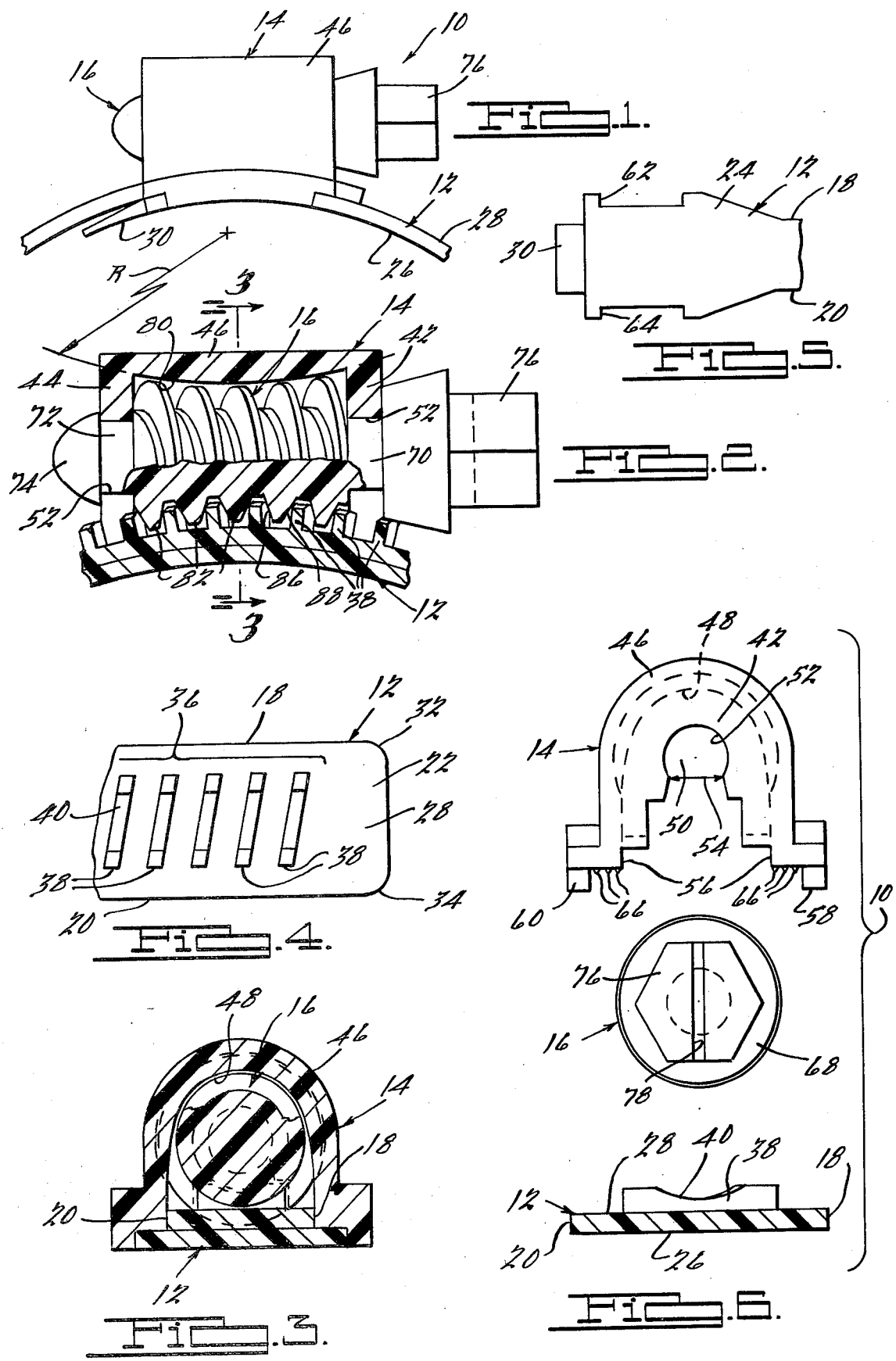

HOSE CLAMP

BACKGROUND AND SUMMARY OF THE INVENTION

Work gear-type clamping devices, such as those found in the below-listed U.S. patents are widely employed since they offer many advantages over spring-type and other fixed diameter devices. For example, such worm gear clamping arrangements are more convenient to use than the analogous spring type devices, do not require special tools for installation and removal, as do many types of spring-type clamping devices, and allow adjustment in accordance with the particular material and dimensions of the associated element to which a clamping force is to be applied. Worm gear clamping devices in the prior art do, however, suffer from a number of disadvantages which include the problems arising from the use thereof in corrosive environments due, primarily, to the fact that such prior art worm gear clamping devices are fabricated of metallic materials. Such corrosion makes removal of these worm gear clamping devices extremely difficult and may subject the devices to premature failure. Additionally, numerous components are usually required to manufacture the prior art clamping devices, rendering them either expensive to produce, and/or time consuming to assemble.

In order to overcome the shortcomings of prior art worm gear clamping devices, it has heretofore been proposed to manufacture such devices from a polymeric material, as is exemplified in some of the below listed patents; however, the prior known and used worm gear-type clamping devices that have been fabricated of from polymeric materials, such as plastic, have also been found to be objectionable from the standpoint that relatively small torque loads may be applied to the worm gears thereof, resulting in inherent limitation of the clamping force which can be applied by the devices.

The present invention provides a solution to the aforementioned problems of not only prior know spring-type clamping devices, but also metallic and plastic-type worm gear clamping devices in the prior art, whereby to provide a new and improved clamping arrangement which can be used in highly corrosive environments, and where relatively large clamping forces must be applied thereby. In particular, the present invention provides a new and improved clamping device which is fabricated entirely of a polymeric material, whereby to assure against attrition due to corrosion and the like. The particular worm gear employed in the clamping device of the present invention is operatively associated with an enclosure member or housing, both of which are designed such that relatively large torque loads may be applied to the worm gear without undesirable deflection or deformation of the worm gear occurring which, in the past, has been a significant limitation in prior known plastic or polymeric fabricated clamping devices.

It is accordingly a general object of the present invention to provide a new and improved hose-type clamping device.

It is a more particular object of the present invention to provide a new and improved clamping device of the above character which is fabricated entirely of a polymeric material.

It is yet a more particular object of the present invention to provide a new and improved clamping device which may have relatively large applications of torque applied to the worm gear thereof so as to be capable of exerting a proportionately large clamping load to an associated workpiece.

It is another object of the present invention to provide a new and improved clamping device, as above described, which incorporates a double enveloping worm gear form so as to provide a large degree of contact between the gear teeth and the associated threads on the clamping strap so as to overcome the disadvantages of prior known clamping devices wherein only line contact occurs between the worm gear teeth and the associated teeth of the clamping strap.

It is a further object of the present invention to provide a new amnd improved clamping device, as above described, which is intended to be assembled by sonic welding techniques, so as to minimize assembly time and expense.

It still a further object of the present invention to provide a new and improved clamping device of the above character wherein the housing or enclosure for the worm gear defines an interior cavity or chamber, the profile of which is of a complementary configuration with respect to the profile of the worm gear, so as to minimize to the extreme, the likelihood of any movement or deformation of the worm gear within the housing during the applications of large torque loads thereto.

It is still a further object of the present invention to provide a new and improved clamping device, as above described, wherein the housing is symmetrical in shape and thereby may be installed or assembled upon the associated clamping strap regardless of the end-to-end orientation of the housing with respect to the strap, thus minimizing assembly time.

Other objects and advantages of the present invention will become apparent from the following detailed description taken in conjunction with the accompanying drawing.

RELATED PRIOR ART

| U.S. Pat. No. | Inventor | Date Issued |
| --- | --- | --- |
| 2,689,998 | W. E. O'Shei | 9/28/54 |
| 2,938,690 | A. B. Castle | 5/31/60 |
| 3,035,319 | H. O. Wolff | 5/22/62 |
| 3,371,392 | W. Rueckheim | 3/05/68 |
| 3,435,506 | E. Schmidt | 4/01/69 |
| 3,521,334 | K. E. L. Bergstrom | 7/21/70 |
| 3,840,018 | M. D. Heifetz | 10/08/74 |
| 3,914,832 | S. Petrus | 10/28/75 |
| 4,021,892 | A. E. C. Piper | 5/10/77 |
| 4,024,609 | R. Haynes | 5/24/77 |

BRIEF DESCRIPTION OF THE DRAWING

FIG. 1 is an enlarged fragmentary side elevational view of a portion of the clamping device of the present invention;

FIG. 2 is an enlarged cross-sectional view of the worm gear portion of the clamping device depicted in FIG. 1;

FIG. 3 is a transverse cross-sectional view taken substantially along the line 3—3 of FIG. 2;

FIG. 4 is an enlarged fragmentary top elevational view of a portion of the clamping strap embodied in the clamping device of the present invention;

FIG. 5 is a view similar to FIG. 4 of the opposite end of the clamping strap embodied in the clamping device of the present invention; and FIG. 6 is an exploded assembly view of the various components embodied in the clamping device of the present inventon.

DESCRIPTION OF A PREFERRED EMBODIMENT

Referring now in detail to the drawing and in particular to FIG. 1 thereof, a hose-type clamping device 10, in accordance with one preferred embodiment of the present invention, is shown generally as comprising an elongated flexible strap element 12 having an enclosure member 14 fixedly attached to one end thereof. Disposed interiorly of the enclosure member 14 is a gear element 16 which is adapted to be selectively rotated, whereby to effect advancement of the strap element 12 relative to the enclosure member 14 so that a clamping force may be either applied or released from an associated workpiece (not shown).

Generally speaking, the strap element 12 is of an elongated configuration and includes generally spaced parallel side edges 18 and 20 which terminate at the opposite ends thereof in end portions 22 and 24. The strap element 12 includes an inner side 26 which is of a relatively smooth configuration and an outer side 28 which is provided with a thread form hereinafter to be described. The end portion 24 includes a lead-in ramp 30 which functions in a manner known in the art to assist in leading in the end 22 of the strap element 12 into and through the enclosure member 14 and to provide support for the portion of the element 12 which is adjacent to the enclosure member 14 once the device 10 is operatively installed on the associated workpiece. The end portion 22 of the strap element 12 is preferably formed with radiused corners, as seen at 32 and 34.

In accordance with the present invention, the strap element 12 is provided with a thread form along a preselected longitudinal length thereof, which thread form, generally designated by the numeral 36, is provided on the outer side 28 of the element 12, as previously mentioned. The thread form is preferably of a configuration consisting of a plurality of axially spaced, parallel thread elements which are integrally formed upon the strap element 12 and are arranged, as seen in FIG. 4, to be at a preselected angle relative to the axis of the strap element 12, the particular angle being in accordance with the pitch angle of the associated gear element 16, hereinafter to be described. As best shown in FIG. 6, each of the thread elements 38 is formed with a generally concave recess 40 along the upper side thereof which is preferably of a generally complementary shape with respect to the root diameter of the gear form provided on the gear element 16.

Referring now in detail to the construction of the enclosure member 14, the member 14 includes longitudinally spaced apart end walls 42 and 44 and a generally semi-circular side wall 46, which walls 42–46 define an internal chamber 48 within which the gear element 16 is operatively disposed. Each of the end walls 42, 44 is formed with a generally U-shaped recess 50 defining a semi-circular journal surface 52, the entrance 54 to which is of a slightly reduced or necked-down dimension for purposes to be hereinafter described. Each of the end walls 42, 44 is also formed with a recessed area, as indicated at 56, in order to permit the strap element 12 to be fed through the underside of the enclosure member 14 in the manner shown in FIG. 1. Extending downwardly from the opposite sides of the side wall 46 is a pair of mounting sections 58, 60 which are adapted to be received within complementary-shaped recesses 62 and 64, respectively, formed in the end portion 24 of the strap element 12, whereby to properly orient the enclosure member 14 upon the strap element 12 during assembly thereof.

While the present invention is not intended to be limited to any specific manner of securing the enclosure member 14 to the strap element 12, one preferred method of thus securing the components 12, 14 is by means of sonic welding. Toward this end, a plurality of energy directors, generally designated by the numeral 66, may be provided along each side of the enclosure member 14 at the surfaces thereof which confront the upper side of the strap element 12, which directors 66 function to assure accurate and expeditious joining of the enclosure member 14 to the strap element 12 during a sonic welding operation. It will be appreciated, of course, that various alternative techniques may be used for securing the member 12, 14 together, such as by suitable adhesives or the like, without departing from the scope or fair meaning of the present invention. The energy directors 66 are typically in the form of a plurality of integral ridges arranged in spaced parallel rows which extend along the entire length of the enclosure member 14, as will be appreciated by those skilled in the art.

Referring now in detail to the construction of the gear element 16, as shown in the drawings, the element 16 includes an elongated body 68 which is formed with axially spaced annular journal portions 70, 72. One end of the body 68 is formed with an enlarged diameter head portion 74, while the opposite end of the body 68 is formed with a large diameter tool engaging head portion 76 which, as best seen in FIG. 6, is preferably of a hexagonal shape in transverse cross section and is provided with suitable diametrically extending slot 78. The slot 78 and hexagonal shape of the portion 76 are intended to permit rotation of the gear element 16 by means of a screwdriver-type tool and/or an appropriate size wrench, respectively, in a manner well known in the art.

In accordance with the present invention, the gear element 16 is provided with a double enveloping gear form, generally designated by the numeral 82 which comprises a continuous helical gear extending radially outwardly from the body 68 and being defined by flanking faces 86 and 88. The gear 82 is defined by a surface of revolution of a segment of a circle coaxial with the axis of the circular shape of the strap element 82, with the flank faces 86, 88 of the gear 82 being adapted for engagement with the sides of the thread elements 38.

By virtue of the fact that the acting flank faces 86, 88 are directed toward the center of curvature, as indicated by the letter R, the faces 86, 88 will come into surface contact with the opposite sides of the thread elements 38, whereby to provide a large degree of surface contact between the gear element 16 and thread form 82, as compared to prior art designs wherein only point or line contact occurs between the worm gear and associated thread form of the clamping strap. Accordingly, a significantly greater amount of torque may be applied to the gear element 16 via the portion 76 thereof so that a proportionately greater clamping pressure may be applied to the associated workpiece. Such area contact between the gear element 16 and strap element 12 is particularly important in view of the fact that each of these components, as well as the enclosure member 14 is preferably fabricated of a plastic material, such as an Acetel-type material, for eaxample, Delron, or preferably Celcon, all of which satisfy the requisite imperviousness characteristics which typical clamping devices such as the present invention must be capable of withstanding.

In accordance with another feature of the present invention, the inner periphery of the chamber 48 is of a configuration which is generally complementary to the profile of the gear form 82, i.e., is defined generally by a surface of revolution of a segment of a circle arranged generally coaxial of the axis of the circular shape of the strap element 12, as best seen at 80 in FIG. 2. Such an arrangement results in the gear form 82 being encapsulated on three sides by the enclosure member 14 so that the member 14 is retained in positive engagement with the thread form 36 on the strap element 12. This, of course, assures that the gear element 16 will not be deflected or deformed out of engagement with the thread form 36 even under relatively high torque loads which may be applied to the element 16.

In assembly of the clamping device 10 of the present invention, the journal surfaces 52 and journal portions 70, 72 are dimensioned such that the gear element 16 may be preassembled into the enclosure member 14 by merely having the journal portions 70, 72 "snap into" the recesses 50 formed at the opposite ends of the enclosure member 14. Thereafter, the assemblage consisting of the enclosure member 14 with the gear element 16 installed interiorly thereof may be secured, as by the aforementioned sonic welding procedure, to the end portion 24 of the strap element 12. It is to be noted that in a preferred construction of the present invention, the enclosure member 14 is symmetrical so that the gear element 16 may be operatively inserted into the member 14 with the end portion 76 located at or adjacent either of the end walls 42 or 44, thereby reducing assembly time and effort.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. An adjustable hose-type clamping device fabricated entirely of a polymeric material,
    said device comprising an elongated flexible strap element having a thread form provided integrally along a portion of one side thereof,
    an enclosure member fixedly secured adjacent one end of said strap element and having longitudinally spaced end wall portions and a side wall portion extending between and interconnecting said end walls, each of said end walls including axially aligned openings therein,
    a worm gear element disposed at least in part within said enclosure member, said worm gear element having a helical gear portion of double enveloping form such that the outer edges thereof lie along a longitudinally extending arcuate surface of revolution, the axis of revolution of said surface being coaxial with said worm gear element and journal portions provided adjacent axially opposite ends of said helical gear portion, said journal portions being disposed within said axially aligned openings in said end walls whereby said end walls are operative to support said worm gear element, said helical gear portion engaging said thread form on said strap element,
    said side wall portion extending partially circumferentially around a portion of said gear element and having an interior surface having a generally arcuate contour in an axial direction and positioned closely adjacent said outer edges along the full length thereof, said surface being operative to limit radial deflection of said gear element so as to thereby maintain said gear element in engagement with said thread form, said helical gear portion extending axially a distance substantially equal to the distance between said end walls, and
    means defining a tool engaging portion at one end of said gear element, whereby said gear element may be selectively rotated to effect advancement of said strap relative to said enclosure member.

2. The invention as set forth in claim 1 wherein said thread form comprises a series of longitudinally spaced thread elements integrally formed on said strap element and projecting upwardly therefrom.

3. The invention as set forth in claim 1 wherein said openings in said end wall portions of said enclosure member are formed with generally U-shaped recesses having journal support surfaces adapted to be snap-fitted into engagement with cooperative annular journal portions formed on said gear element at the opposite ends of said double enveloping worm gear form thereon.

4. The invention as set forth in claim 1 wherein said enclosure member includes energy directing means extending longitudinally therealong, whereby said enclosure member may be sonically welded to said strap element.

5. The invention as set forth in claim 1 wherein said strap element is formed with a pair of opposed inwardly extending recessed portions adjacent one end thereof, and wherein said enclousure member includes downwardly projecting portions adapted to be received within said recessed portions of said strap element and thereby longitudinally position said enclosure member along said strap element.

6. The invention as set forth in claim 1 wherein said tool-engaging portion of said gear element comprises a diametrically extending screwdriver engaging slot.

7. The invention as set forth in claim 1 wherein said tool-engaging portion of said gear element comprises a generally hexagonally-shaped wrench engaging surface.

* * * * *